United States Patent
Orwant et al.

(10) Patent No.: US 7,917,153 B2
(45) Date of Patent: Mar. 29, 2011

(54) METHOD AND APPARATUS FOR CREATING, DIRECTING, STORING AND AUTOMATICALLY DELIVERING A MESSAGE TO AN INTENDED RECIPIENT UPON ARRIVAL OF A SPECIFIED MOBILE OBJECT AT A DESIGNATED LOCATION

(75) Inventors: Jonathan Lee Orwant, Cambridge, MA (US); Joshua C. Randall, Cambridge, MA (US); Pascal R. Chesnais, Cambridge, MA (US)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/813,955

(22) Filed: Mar. 31, 2004

(65) Prior Publication Data

US 2005/0227711 A1    Oct. 13, 2005

(51) Int. Cl.
- H04M 11/04   (2006.01)
- H04M 1/725   (2006.01)
- H04W 24/00   (2009.01)

(52) U.S. Cl. ............ 455/456.1; 455/404.2; 455/412.1

(58) Field of Classification Search ........... 455/456.3, 455/456.2, 456.1, 404.2, 412.1, 412.2, 414.2, 455/419

See application file for complete search history.

(56) References Cited

U.S. PATENT DOCUMENTS

| | | | |
|---|---|---|---|
| 5,760,742 A | | 6/1998 | Branch et al. |
| 6,625,456 B1 * | | 9/2003 | Busso et al. ............ 455/456.2 |
| 6,647,257 B2 * | | 11/2003 | Owensby .................. 455/414.1 |
| 6,662,013 B2 * | | 12/2003 | Takiguchi et al. ........ 455/456.2 |
| 6,684,068 B1 | | 1/2004 | Tikka et al. |
| 6,879,835 B2 * | | 4/2005 | Greene et al. ............. 455/456.1 |
| 6,987,976 B2 * | | 1/2006 | Kohar et al. .............. 455/456.1 |
| 2002/0032035 A1 * | | 3/2002 | Teshima ..................... 455/456 |
| 2002/0123327 A1 * | | 9/2002 | Vataja ........................ 455/412 |
| 2002/0127997 A1 | | 9/2002 | Karlstedt et al. |
| 2002/0177435 A1 * | | 11/2002 | Jenkins et al. ............. 455/412 |
| 2004/0198396 A1 * | | 10/2004 | Fransioli ................... 455/456.3 |
| 2004/0209601 A1 * | | 10/2004 | Obradovich et al. ...... 455/414.1 |
| 2005/0113107 A1 * | | 5/2005 | Meunier .................... 455/456.1 |
| 2005/0136895 A1 * | | 6/2005 | Thenthiruperai et al. . 455/412.2 |
| 2005/0143909 A1 | | 6/2005 | Orwant |
| 2005/0186969 A1 * | | 8/2005 | Lohtia ....................... 455/456.3 |

FOREIGN PATENT DOCUMENTS

| | | |
|---|---|---|
| EP | 1 220 553 A1 | 7/2002 |
| WO | WO 01/84867 A1 | 11/2001 |
| WO | WO 02/39766 A1 | 5/2002 |

OTHER PUBLICATIONS

"Frequently Asked Questions About Geocaching", http://www.geocaching.com/faq. 2003.

* cited by examiner

*Primary Examiner* — Nay Maung
*Assistant Examiner* — Andrew Wendell
(74) *Attorney, Agent, or Firm* — Thorne & Halajian, LLP; Gregory L. Thorne

(57) ABSTRACT

A technique to electronically deliver a message from a sender to an intended recipient based on tracking movement of a mobile object, including obtaining a message provided by the sender, obtaining a location designated by the sender for delivery of the message, tracking a specified mobile object having a position-determining device that determines its own current position, and which transmits its then current position at preset time intervals, determining from the transmitted current position whether the specified mobile object has reached the designated location, and initiating a procedure for automatic delivery of the message electronically to the intended recipient upon the specified mobile object being determined to have reached the designated location.

31 Claims, 6 Drawing Sheets

Table No. 1

| SENDER'S GUID | RULE NAME | LOCATION TYPES | LOCATIONS | RADIUS | START TIME | END TIME | PROXIMITY CONDITIONS OF MOBILE OBJECTS | OTHER CONDITIONS |
|---|---|---|---|---|---|---|---|---|
| 2CB8 | OfficeDirections | Street | 175 2nd St | 50m | | | | |
| 2CB8 | RestaurantRec | Street | 8 Mass Ave | 10m | | | | |
| 2CB8 | FloatingCoupon | Street | 7 Main St | 300m | 10:00:00 | 18:00:00 | | |
| 2CB8 | NotAtHome | Street | ~15 Elm St | 50m | | | | |
| 2CB8 | SurpriseParty | State | New York | 0m | | Jan 30 | abs(SELF-Jon)>30m | |
| 2CB8 | GarageDoor | Street | 15 Elm St | 250m | | | abs(Jon-15ElmSt)<250m | |
| 2CB8 | Luggage | City | ~Cambridge | 0m | | | abs(Jon-Luggage)>100m | |
| 2CB8 | Weather | Lat/Long | 40.3N, 118.1W | 1m | 5:00:00 | 10:00:00 | | weather(40.3N, 118.81W, inclement) |
| 2CB8 | DyingMessage | Name | CemeteryPlot | 2m | 6/25/2024 | | | |

FIG. 5

Table No. 2.

| SENDER'S GUID | RECIPIENT'S NAME | RECIPIENT'S GUID LIST |
|---|---|---|
| 3A7F | John | 2CB8 |
| 3A7F | Tom | D113 |
| 2CB8 | Thomas | D113 |
| 2CB8 | Team | D113, EF9B, 76A4 |
| 2CB8 | John's Garage | 7E45 |

Table No. 3.

| SENDER GUID | RECIPIENT GUIDs | RULE NAME | REPEAT VALUE | MESSAGE_TYPE | MESSAGE |
|---|---|---|---|---|---|
| 2CB8 | D113, EF9B, 76A4 | Office Directions | OPTION 4 | text/plain | Take the elevator to the 12th floor.... |
| 2CB8 | 2CB8 | Weather | OPTION 1 | text/plain | Heavy rains expected this afternoon... |
| 3A7F | 2CB8 | Surprise Party | OPTION 2 | text/html | \<B>Sam is approaching the house -- get ready!\<B> |

Table No. 4.

| GUID | ADDRESS_TYPES | ADDRESSES |
|---|---|---|
| 3A7F | phone | 16175551212 |
| D113 | phone,email | 12024561212, joe@example.com |
| 2CB8 | email,AIM | alice@example.com, alice2007 |

METHOD AND APPARATUS FOR CREATING, DIRECTING, STORING AND AUTOMATICALLY DELIVERING A MESSAGE TO AN INTENDED RECIPIENT UPON ARRIVAL OF A SPECIFIED MOBILE OBJECT AT A DESIGNATED LOCATION

FIELD OF THE INVENTION

The present invention is directed to position-based communication and, in particular, to a technique for enabling a sender to tag messages with a designated location for automatic delivery to an intended recipient upon the arrival at such location of a specified mobile object.

BACKGROUND OF THE INVENTION

A number of techniques have been developed to track the position of a mobile object (e.g., people, vehicles, pets) on the earth's surface at any given time. Perhaps the best known technique involves the global positioning system ("GPS"). GPS technology uses transmitters carried by orbiting satellites. A receiver mounted on the mobile object that is being tracked polls the signals transmitted by the satellite to calculate its distance from that satellite. The receiver applies triangulation by detecting signals from three or more GPS satellites to determine its own latitude and longitude on the earth's surface, or from four or more GPS satellites to determine its latitude and longitude, and also its altitude.

Such a position tracking device outputs a specific, precise latitude/longitude/altitude datapoint. For purposes of the discussion presented herein, it should be understood that the term "position" refers to the geographic counterpart of a particular datapoint.

Because every position tracking technology has some inherent inaccuracy, including GPS, the calculated position will often fluctuate around the object's true position. Furthermore, something having a meaningful geographic significance to a person (such as a street address) often does not have a sharply defined boundary. To remedy these problems, an appropriate technique is applied to group together nearby positions to be treated as a single geographic "location". Thus, the term "location" as used herein refers to a single position or a plurality of nearby positions corresponding to each other in some way, and perhaps having some meaningful significance to a person. One technique for identifying positions that deserve to be grouped together is called clustering. More information on the significance of these terms (i.e. position, location, clustering) and how such information is useful for the present invention is set forth in co-pending, commonly-owned U.S. patent application Ser. No. 10/751, 058 filed Dec. 31, 2003 and titled "TECHNIQUE FOR COLLECTING AND USING INFORMATION ABOUT THE GEOGRAPHIC POSITION OF A MOBILE OBJECT ON THE EARTH'S SURFACE", the content of which is hereby incorporated by reference.

A person utilizing the present invention will not normally know a precise datapoint and will more likely use an address of some type which, as explained above, involves a cluster of positions referred to as a location. Therefore, the term "position" is used herein in connection with the precise data outputted by a tracking device while, in contrast, the term "location" is used herein (in addition to being the output of the cluster algorithm) as convenient shorthand (with its meaning being clear from the context) to refer to any position, location or region (this term is discussed below) specified by the sender for the purpose of automatic message delivery to a recipient.

Tracking an object has been used not only to know the object's current position at any given time but also for the purpose of conveying information. For example, U.S. Pat. No. 5,760,742 uses GPS technology to create and annotate GIS (Geographic Information Systems) databases. A vehicle carrying the apparatus can receive geographic information transmitted from a base station specific to a designated location, and the operator can also transmit to the base station geographic information concerning a certain location to update or enhance the previously available geographic information for that location. Also, the game of geocaching (information about it is available at www.geocaching.com) is based on placing caches at specified locations that contain prizes and/or information which can be obtained when (if) the cache is found. GPS units are used to play geocaching. However, none of the known location-based techniques serves to, in effect, enable a sender to leave a message for an intended recipient "floating in the air" at a particular location just waiting for the intended recipient to arrive, at which time the message becomes automatically "visible".

SUMMARY OF THE INVENTION

One object of the present invention is to facilitate creation and storage of a message from a sender for later delivery to an intended recipient upon arrival of a specified mobile object at a location designated by the sender.

Another object of the present invention is to enable automatic position-based communication between a sender and recipient based on position-determining technology.

Yet another object of the present invention is to enable a sender to control delivery of a message so that it is delivered automatically to an intended recipient, but only if certain conditions are met which were set by the sender in connection with a specified mobile object reaching a designated location.

A further object of the present invention is to enable an intended recipient to automatically receive a message at a specific location designated by the sender.

These and other objects are attained in accordance with one aspect of the present invention directed to a technique to electronically deliver a message from a sender to an intended recipient based on tracking movement of a mobile object, including obtaining a message provided by the sender, obtaining a location designated by the sender for delivery of said message, tracking a specified mobile object having a position-determining device that determines its own current position, and which transmits its then current position at preset time intervals, determining from the transmitted current position whether the specified mobile object has reached said designated location, and initiating a procedure for automatic delivery of said message electronically to the intended recipient upon said specified mobile object being determined to have reached said designated location.

Another aspect of the present invention is directed to a technique for delivering a message with an electronic communication system servicing a plurality of clients in a client-server relationship, wherein the system includes a server, and wherein each of the clients includes a position-determining device, including obtaining, at the server, a message based on input from a first client, obtaining, at the server, a designated location based on input from said first client, obtaining, at the server, an identification of a second client as the intended recipient of said message, based on input from said first client, obtaining, at the server, identification of a mobile client to be tracked for delivery of said message, determining, from the position-determining device of said client to be tracked for delivery of said message, whether said client being tracked has arrived at said designated location; and automatically triggering electronic delivery of said message to the intended recipient upon said tracked mobile client being determined to have arrived at said designated location.

Yet another aspect of the present invention is directed to a technique for delivering a message with an electronic communication system servicing a plurality of clients in a client-server relationship, wherein the system includes a server, and wherein each of the clients includes a position-determining device, and including obtaining, at the server, a message based on input from a first client, obtaining, at the server, a designated location based on input from said first client, obtaining, at the server, a delivery rule based on input from said first client for delivering said message to an intended recipient, wherein said delivery rule includes arrival of a specified mobile client at said designated location, determining, from the position-determining device of said mobile client, whether said specified mobile client has arrived at said designated location, and upon said specified mobile client being determined to have arrived at said designated location, triggering electronic delivery of said message to the intended recipient, based upon said delivery rule.

A further aspect of the present invention is directed to a technique for automatically delivering a message electronically, comprising obtaining an electronic message based on input from a sender, obtaining an intended recipient, a designated location, and a selected mobile object having a position-determining device, based on input from the sender, and using position-determining technology to automatically deliver said message electronically to the intended recipient upon the selected mobile object being determined to have arrived at the designated location.

A still further aspect of the present invention is directed to a technique for automatically delivering a message electronically from a sender with a communication system servicing a plurality of potential recipients, and based upon position-determining technology, comprising obtaining a message based on input from the sender, obtaining a designated location based on input from the sender, obtaining identification of at least one recipient, from among the plurality of potential recipients, specified based on input from the sender as an intended recipient of the message, obtaining a selected mobile object specified based on input from the sender, and automatically delivering said message electronically to said intended recipient based upon the position of said selected mobile object, as derived from the position-determining technology, relative to said designated location.

One other aspect of the present invention is directed to a technique for automatically delivering a message electronically from a sender with a communication system servicing a plurality of potential recipients, and based upon position-determining technology, comprising obtaining a message based on input from the sender, obtaining a designated location based on input from the sender, obtaining identification of at least two recipients, from among the plurality of potential recipients, specified based on input from the sender as intended recipients of the message, and automatically delivering said message electronically to one of said intended recipients based upon the position of said one of the intended recipients relative to another of said intended recipients, as derived from the position-determining technology.

Another aspect of the present invention is directed to a technique for delivering a message with an electronic communication system, wherein the system includes a server, and with the system servicing a plurality of clients in a client-server relationship, at least some of the clients being mobile and having a position-determining device, and including obtaining, at the server, a message based on input from a first client, obtaining, at the server, an identification of a second, mobile client as the intended recipient of said message, based on input from said first client, obtaining, at the server, an identification of a third client, based on input from said first client, and automatically triggering electronic delivery of said message to the intended recipient upon said second, mobile client being determined to have arrived at a designated position relative to the position of said third client.

Yet another aspect of the present invention is directed to a technique for operating an electronic communications system servicing a plurality of users for enabling any sender who is a user to automatically deliver a message electronically to an intended recipient who is also a user, based on the tracked position of a specified mobile object, including processing and storing message data provided by the sender, tracking the position of the specified mobile object, and automatically delivering a message electronically to the intended recipient upon arrival of the specified mobile object at a designated location.

BRIEF DESCRIPTION OF THE DRAWINGS

FIG. 5 is a table showing several exemplary delivery rules stored in the server that impose conditions on the delivery of messages in accordance with the present invention.

FIG. 6 shows three additional tables stored in the server for the delivery of messages in accordance with the present invention.

DETAILED DESCRIPTION OF THE DRAWINGS

Figure 1:
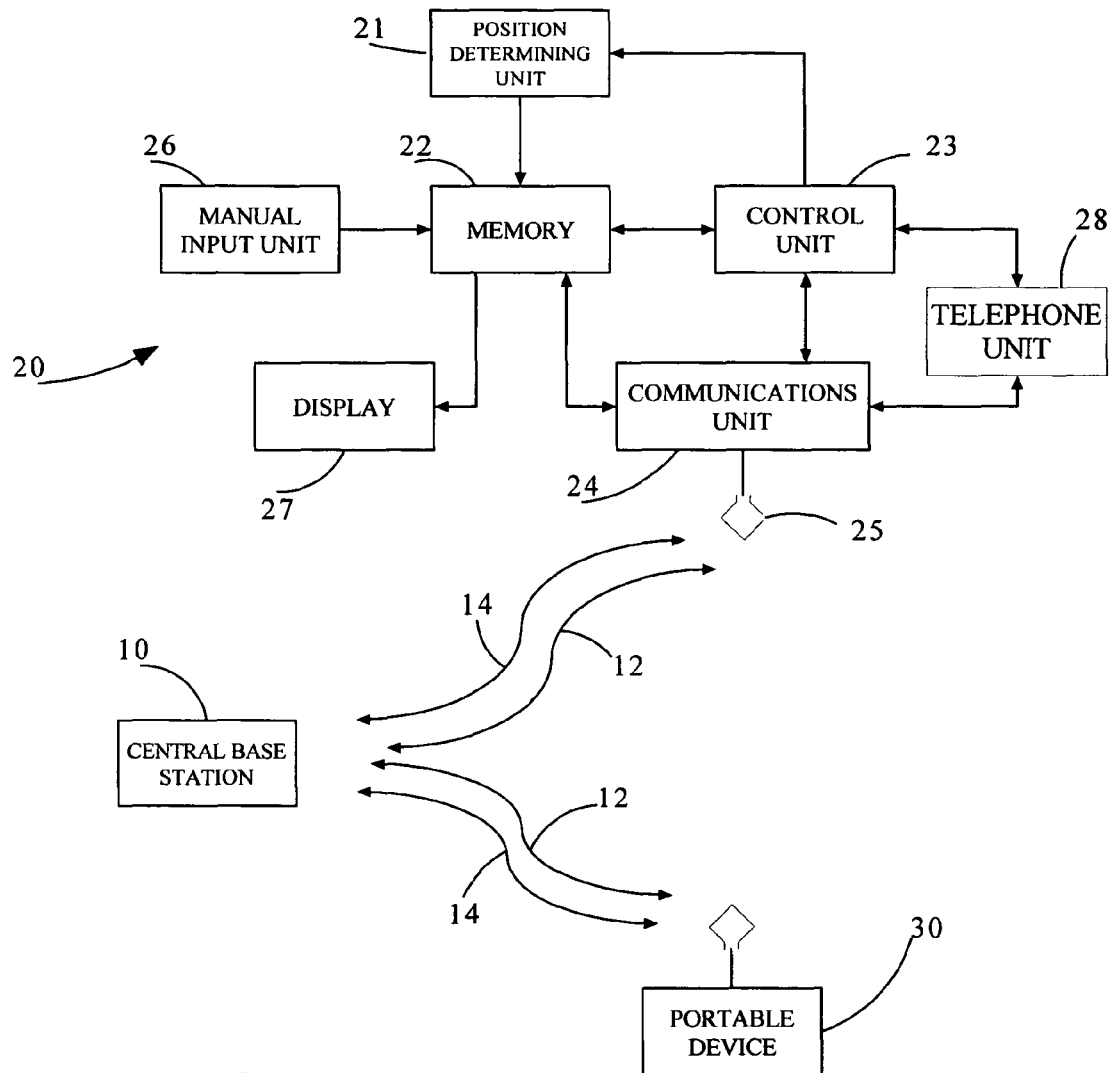
FIG. 1 is directed to a schematic block diagram of a system for implementing the present invention.

For purposes of the discussion presented herein, the below-listed terms are defined as follows.

A "mobile object" (or simply "object" henceforth) is any animate (e.g. people, vehicles, pets) or inanimate (e.g. luggage) entity capable of being moved. Each of the mobile objects is assumed to be equipped with a portable signaling unit having a position-determining device that periodically reports its position to a central base station, as described in the above-mentioned co-pending application.

A "region" is a volume on the surface of the earth that can include one or more locations. Examples include a street address, a zip code, a city, a state, a country, a path (i.e. a route taken by a mobile object to get from one position to another) or negations of volumes (e.g., anywhere but a particular street address).

A "sender" is a person having access to a "sending device" (see below) for use in accordance with this invention.

A "recipient" is an entity or set of entities having access to a "receiving device" (see below) which is capable of receiving a "location-based message" (see below). Examples include mobile objects, such as particular individuals and groups of individuals, all individuals, and negations of particular groups or individuals. A recipient can also be a non-mobile object such as an electronic device capable of receiving remote messages for actuating some predetermined function (e.g. a garage door opener). An "intended recipient" is a particular recipient to whom delivery of the message is intended by the sender.

A "location-based message" (or simply "message" henceforth) is a private communication, including text, audio, video, stills, other modalities, or combinations of modalities, which is automatically delivered only when a specified mobile object is at a particular location (as that term is used to refer to a position, location or region specified by the sender). The presence of an object at a location is a necessary but not sufficient condition for delivery because other conditions (see "delivery rule" below) may apply.

A "delivery rule" (or simply "rule" henceforth) is a set of imposed conditions that must be met in order for a message to be automatically delivered to its intended recipient(s). One of the conditions must be the presence of an object within a region. Some delivery rules are created just for one particular location-based message while others can be used repeatedly.

A "sending device" is a hardware and/or software system used to create a location-based message and a delivery rule to direct the automatically delivery of such message to its intended recipient. Such devices send, for example, TCP/IP messages over a computer network to a server. Examples are certain mobile phones, handheld computers, personal digital assistants, and web browsers on networked computers. For convenience, the sending device is sometimes referred to below as a "client" of a server in what is commonly referred to as a client-server relationship.

A "receiving device" is a hardware and/or software system that can receive messages from a server, where those messages can be provided by a networked computer. Examples are mobile phones, handheld computers, personal digital assistants, email clients, and telephone answering machines. For convenience, the receiving device is also sometimes referred to below as a "client" of a server in a client-server relationship.

A "server" is a hardware and/or software system that is able to, inter alia, receive messages from sending devices, receive delivery rules from the sending devices, determine whether and when delivery rules are satisfied, and is able to cause the automatic delivery of each message to the receiving device associated with the intended recipient.

Each mobile object is provided with a portable signaling unit having a position determining device (this expression is used herein interchangeably with position sensing device) which is capable of automatically determining its position. Data corresponding to the position of the mobile object is continuously transmitted, along with its identification signal, at periodic intervals to a central base station housing a server which gathers (e.g. detects, processes and/or stores) the position data and authenticates the inputted identification signal. The portable signaling unit with its position determining device is used interchangeably herein with "client". This type of client-server communication is well known. Thus, the server is capable of tracking the object's position. In fact, the server is capable of doing so for a very large number of objects.

An overview of the invention and its utilization will be provided first, followed by a detailed explanation. Suppose that a person (who carries a portable signaling unit) is on his way home along Route 100 and needs to bring home some groceries. To minimize the risk that he will forget to do so, his wife (the sender) will leave him (the intended recipient) a reminder message to do so which she will tag with a location. She will choose a location that is on his way home along Route 100 and which is also near the grocery store, say the intersection of Route 100 with XYZ Street. Her reminder message will be stored in the server such that, for visualization purposes, it will be "floating in the air" at that intersection until he arrives there, at which time the reminder message will be delivered by the server to him automatically on, for example, his mobile phone in text and/or audio form. The automatic delivery of the message is triggered by the intended recipient's arrival at the designated location. The intended recipient need not take any action to have the message delivered to him nor, in fact, does he even need to know that a message is waiting for him. Of course, it is readily apparent that the same person can be both the intended recipient and the sender, For example, the sender can leave such a "floating" reminder (e.g. in the morning on the way to work) for later delivery to himself (e.g. in the evening on the way home from work) as a reminder to bring home the groceries.

Up to this point the invention has been described in connection with the intended recipient being a mobile object the position of which triggers automatic delivery of the message. However, it should also be noted that the invention is applicable to delivery of a message to a stationary, even inanimate, intended recipient. For example, the intended recipient might be an entry door actuation device, the message is a signal for automatically unlocking the door, and the mobile object which triggers delivery of the message is carried by the home owner (i.e. so that the door is automatically unlocked when the owner arrives at home). It should further be noted that the invention is applicable to a mobile object which is not the one that triggers message delivery. For example, a message could be automatically delivered to John when Steve reaches a designated location.

When the sender wishes to create a location-based message, he inputs a message and designates a delivery location with which to tag the message. The sender can designate a single recipient, several particular recipients, a category of recipients, etc. as the intended recipient(s). The sender can set certain delivery rules, such as an expiration date for message delivery. That message data, i.e. message content, delivery location, intended recipient, and delivery rule (which includes the designated delivery location) will be transmitted to the server and stored therein. When, for example, the recipient's portable signaling device ("client") communicates to the server a position that is determined by the server to be at the designated location, and all other conditions of the delivery rule are satisfied, the server will automatically retrieve and communicate the message specific to that location and for that particular recipient.

Where is the designated location at which the message is to be delivered? This can conceivably be a single position specified by its datapoint, namely longitude, latitude and altitude. However, for practical reasons the sender cannot be expected to know and remember such precise data. Therefore, the sender will be more likely to specify, for example, a street address. Areas larger than a location (as this term is applied to the output of a technique such as clustering for grouping associated positions), referred to hereinabove as regions, are also usable. Another way that a location can be identified is by a name that represents something which has meaning to a particular sender, such as "home" or "office". Designating a location by a preselected name is also disclosed in the above-mentioned co-pending application.

By way of a brief review, the designated location will cover a geographic area that includes a cluster of positions as determined by the clustering technique disclosed in the above-mentioned co-pending application. The periphery of the area that includes the cluster is determined by a convex hull algorithm which is also described in the above-mentioned co-pending application. Moreover, as explained above, the location can be used in combination with other factors, such as by applying a radius around the specified location, to designate a region. A region can also be identified independent of a specific location, such as with a zip code. In this way a region can have almost any desired shape and size.

Here is a simple example of a message that a sender could compose and have delivered with the present invention: "John—I'm on the twelfth floor. Turn left at the elevators."

A simple delivery condition for this message would be to deliver the message to John at 551 Fifth Ave. This is set forth more formally as:
Recipient: John
Location: 551 Fifth Ave.

Some successively more complex delivery rules that might be applied to the same message are presented below.

A region related to the specified location can be defined as a circle by regarding the location as the center of the circle and adding a radius, namely:
Recipient: John
Location: 551 Fifth Ave.
Radius: 100 meters Another recipient can be added as follows:
Recipient: John, George
Location: 551 Fifth Ave.

A group of recipients can be added as follows:
Recipient: Employees of Company ABC.
Location: 551 Fifth Ave.

A message can be delivered to the entire public when anyone is within the specified region (such as when a store sends advertising messages to all those potential shoppers who are passing nearby), as follows:
Recipient: *
Location: 551 Fifth Ave.
Radius: 100 meters A particular recipient, such as Steve, can be excluded from a group, as follows:
Recipient: *, ~Steve
Location: 551 Fifth Ave.
Radius: 100 meters A start time and an end time (e.g. expiration date) for the message can be imposed, as follows:
Recipient: John
Location: 551 Fifth Ave.
Radius: 100 meters
Start: Feb. 28, 2004, 9 am EST
End: Mar. 2, 2004, 8 pm EST An auxiliary location constraint can be imposed, such as specifying that a message should not be delivered to John if Steve is near John when both are within the region, as follows:
Recipient: John
Location: 551 Fifth Ave.
Radius: 100 meters
Deliver-if: distance (Steve, 551 Fifth Ave.)>100 m In fact, this invention is so flexible and powerful that there is practically no limit to implement what a sender's needs and imagination can create. For example, the following directs that a message will be delivered only if the Dow Jones Industrial Average (DJIA) exceeds 10,000 and the weather in Boston is raining:
Recipient: John
Location: 551 Fifth Ave.
Radius: 100 meters
Start: Feb. 28, 2004, 9 am EST
End: Mar. 2, 2004, 8 pm EST
Deliver-if: DJIA>10000 and weather(BOS) eq "raining"

Turning now to a more detailed explanation of the invention, FIG. 1 shows a central base station 10 which is in communication with a plurality of portable signaling units ("clients") represented by units 20 and 30. Components of portable signaling unit 20 are shown, and it should be understood that the other portable signaling units usable with this invention, of which unit 30 is exemplary, are identical (insofar as relevant to the present invention) to unit 20. Of course, the portable signaling units are respectively carried by mobile objects.

Client 20 includes position determining device 21. This device 21 can incorporate well known GPS technology to derive latitude, longitude and altitude data that is stored in memory 22. Client 20 also includes control unit 23, one function of which is to automatically trigger at pre-selected time intervals the sequence of steps for detecting the GPS signals and determining the position of client 20, and for continuously transmitting the determined positions (together with its globally unique identifier, "GUID", which has been uniquely assigned to it and pre-stored therein) to the base station at periodic intervals. Such pre-selection of time intervals is a matter of design choice which trades off the resolution of the user's position as a function of time against the required data storage and battery life. The term "user" is applied herein to people, whereas the term "client" is applied to equipment that a "user" would have to take advantage of the features available with the present invention.

The control unit 23 can be designed to transmit the position data immediately to the server, or to store in memory 22 the position data for a predetermined number of positions and then to transmit the data for all such positions as part of a batch transmission. In the preferred embodiment, the client 20 transmits a batch message over the air at periodic intervals to the server which is equipped with a suitable database. The message is a digital encoding of a series of positions.

Communications unit 24 receives control signals from control unit 23 and position data from memory 22 to perform the above-described transmission of position data to the server via antenna 25. In particular, unit 24 compresses (using a run-length-encoding algorithm, for example) the stored data and transmits it via GPRS 12 (Generalized Packet Radio Service, details of which are available at http://www.gsm-world.com) to the server. Such communication units and how they generally operate in this type of an arrangement are well known, and additional pertinent details can be found in the above mentioned co-pending patent application. Therefore, providing further details thereof herein is not deemed necessary.

Client 20 also includes an I/O interface. In particular, manual input unit 26, such as an alphanumeric keyboard, enables the sender to enter message data, namely a message, an intended recipient, and a delivery rule. Display 27 can show the information that has been inputted by the sender, messages received by the intended recipient in accordance with the invention (as explained below), and whatever else is displayable in connection with operation of the portable signaling unit. For example, client 20 can include a mobile telephone the functions of which are schematically represented as telephone unit 28. In such case, manual input unit 26 can also function as the keypad for telephone unit 28. The message can be in the form of text inputted with a keyboard or an audio message dictated via a microphone, both of which capabilities can be part of manual input unit 26. Of course, the microphone can be the same one used for telephone unit 28. Thus, the message data entries made by the sender are stored in appropriate field(s) of memory 22, and the message data is transmitted under control of unit 23 via communications unit 24 along with the position data. Communications unit 24, in addition to its GPRS text-related capabilities, receives signals for its telephonic voice-related functions via a cellular network 14.

Central base station 10 includes the hardware and software that is well known for performing conventional server functions. This includes mass data storage equipment and software for a database usable to store the required information. It includes suitable GPRS and cellular communications apparatus for communicating with the clients. It also includes appropriate software for performing the conventional, related functions.

A useful apparatus for use as a portable signaling unit to implement the invention is a mobile phone enhanced with GPS technology because it can serve as the position-sensing device, the sending device and the receiving device. More specifically, the GPS technology in this apparatus can provide the position sensing function, its keyboard and display enable the sender to compose and send the message data to the server (i.e. it acts as the sending device), and its audio and video features enable the receipt of the message as well (i.e. it acts as the receiving device). In a preferred embodiment, the portable device is a Nextel i88s or i95s mobile phone with GPS chipsets. This phone runs a J2ME software program that performs a number of tasks, including polling GPS satellites, outputting its GUID, and calculating its current latitude, longitude and altitude.

Figure 2:
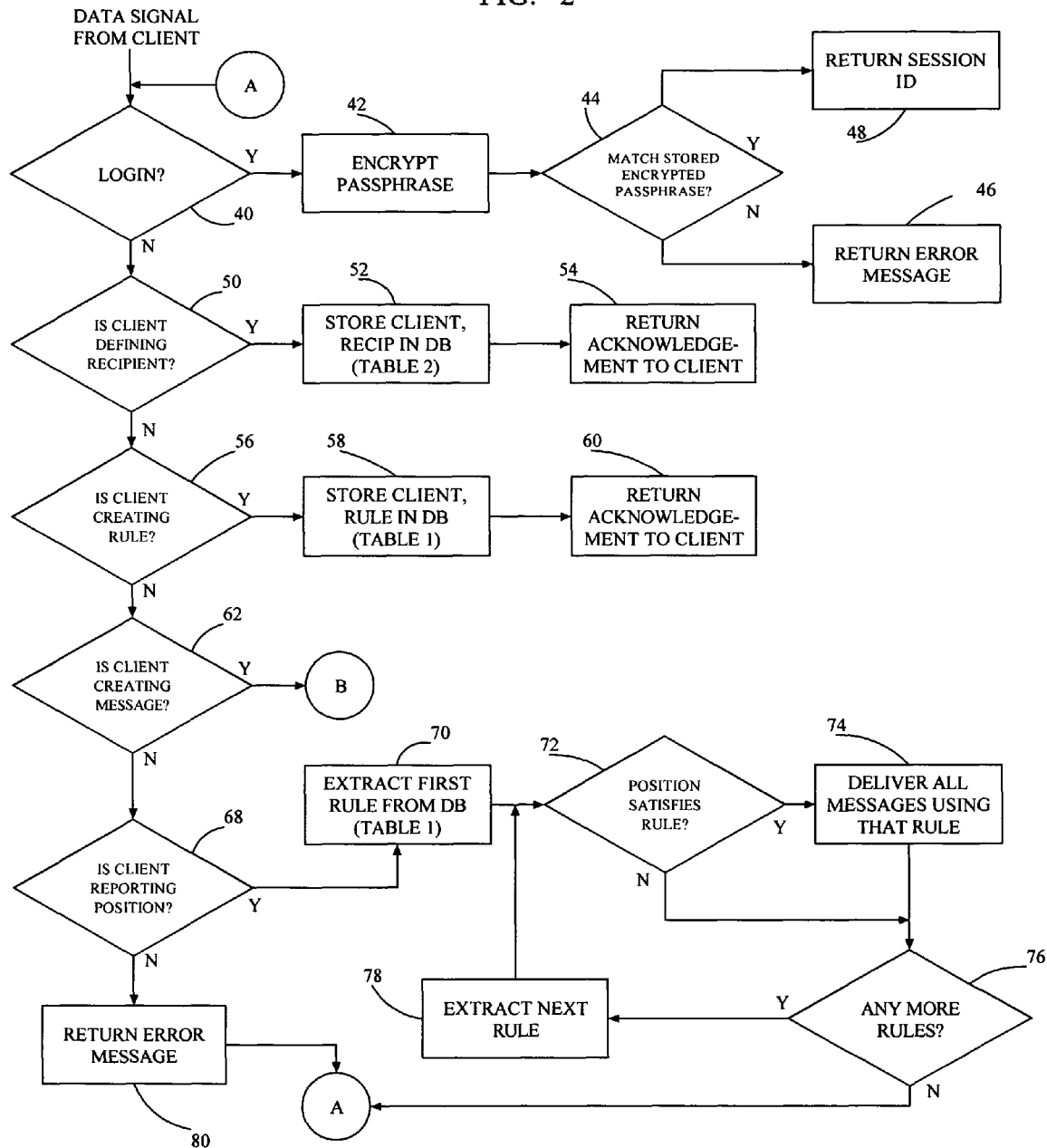
FIG. 2 is a flowchart of functions performed in accordance with the present invention by the server in the central base station of FIG. 1.

The flowchart of FIG. 2 depicts the operations carried out by the server for implementing the invention. The server continuously fields any one of the following requests from the portable signaling units ("clients"), i.e. the sending devices and receiving devices:
1. a client attempts to LOGIN, per 40;
2. a client defines a recipient, per 50;
3. a client creates a rule, per 56;
4. a client creates a message, per 62; and
5. a client reports its position, per 68.

The position data and GUID from each of the clients is received via GPRS 12. The server requires each client (i.e. sender and recipient) to be logged in before access for certain functions will be permitted. Each client has a previously registered passphrase. If a client attempts to LOGIN, as determined per 40, the server encrypts the passphrase, per 42, using a standard encryption function and compares the results, per 44, to the encrypted passphrase already stored for that client's GUID in its database as part of the previous registration process. If they do not match, then a suitable error message is returned (i.e. transmitted) to the device, per 46. If they do match, then the server generates a code, called a SESSION ID, which is unique to the current session. The SESSION ID is stored in the server and also returned to the client, per 48, so that it can be used later, such as for authenticating other client requests, as explained below.

If the sending device is defining a recipient, as per 50, the server stores, per 52, the association between the recipient's name (which corresponds to an individual, e.g. "John", or to a group, e.g. "Team") and all required GUIDs (e.g. John's GUID or the GUIDs of the members of the "Team" group) in a persistent database. This is shown in Table 2. The server then returns an acknowledgment to the client, per 54. Referring to Table 2, in the first example listed therein, the sender whose GUID is 3A7F (whose name is not listed in this table) identifies the intended recipient for his message by the name John, and John's GUID is listed as 2CB8. The server already "knows" the sender's GUID from the login. The recipient's name (and/or perhaps other data such as email address and phone number) is manually keyed in by the sender, or perhaps it is selected from a pre-stored list in the sending device. The recipient's GUID is generated by the server in one of two ways. If the recipient is already "known" to the server, then the information entered by the sender is used by the server to find the associated GUID. If, however, the recipient is not "known" to the server, the server will assign a GUID to the information entered by the sender.

If it is determined, per 56, that the sender is creating a rule, the server stores the rule in a persistent database, per 58. The server then returns an acknowledgment to the client, per 60. Table 1 lists several examples of such rules. All the rules shown in Table 1 were established by the client having the GUID 2CB8. The self-explanatory fields in Table 1 are the Sender's GUID (i.e. the GUID of the sending device used by this sender), Rule Name, Locations, Radius, Start Time and End Time. The Location Type field is needed because, as explained above, a location can be any one of a zip code, street address, city, etc. The server must be informed as to which of these types the data in the Location field corresponds so that, for example, a number inserted in the Locations field will be correctly interpreted as being an address, datapoint or zip code. In this embodiment, the delivery location is defined by the combination of the Location Type field and the Location field.

Several of the exemplary rules that are listed in the table have locations that are street addresses. However, the Weather rule specifies a datapoint because, for example, the message describing the weather conditions may be intended for a ship sailing in the Atlantic Ocean where that specific position is of importance and, in fact, there likely is no "location" which is a meaningful cluster of positions. The Proximity Conditions field for the "SurpriseParty" rule directs that delivery of the message (concerning a surprise party planned for John) can be made only if the distance between the intended recipient and John is greater than 30 m (in order for John not to overhear the conversation and thereby spoil the surprise). Finally, the "Other Conditions" field is a catchall for anything else that the sender needs to or wishes to set, such as the DJIA.

Figure 3:
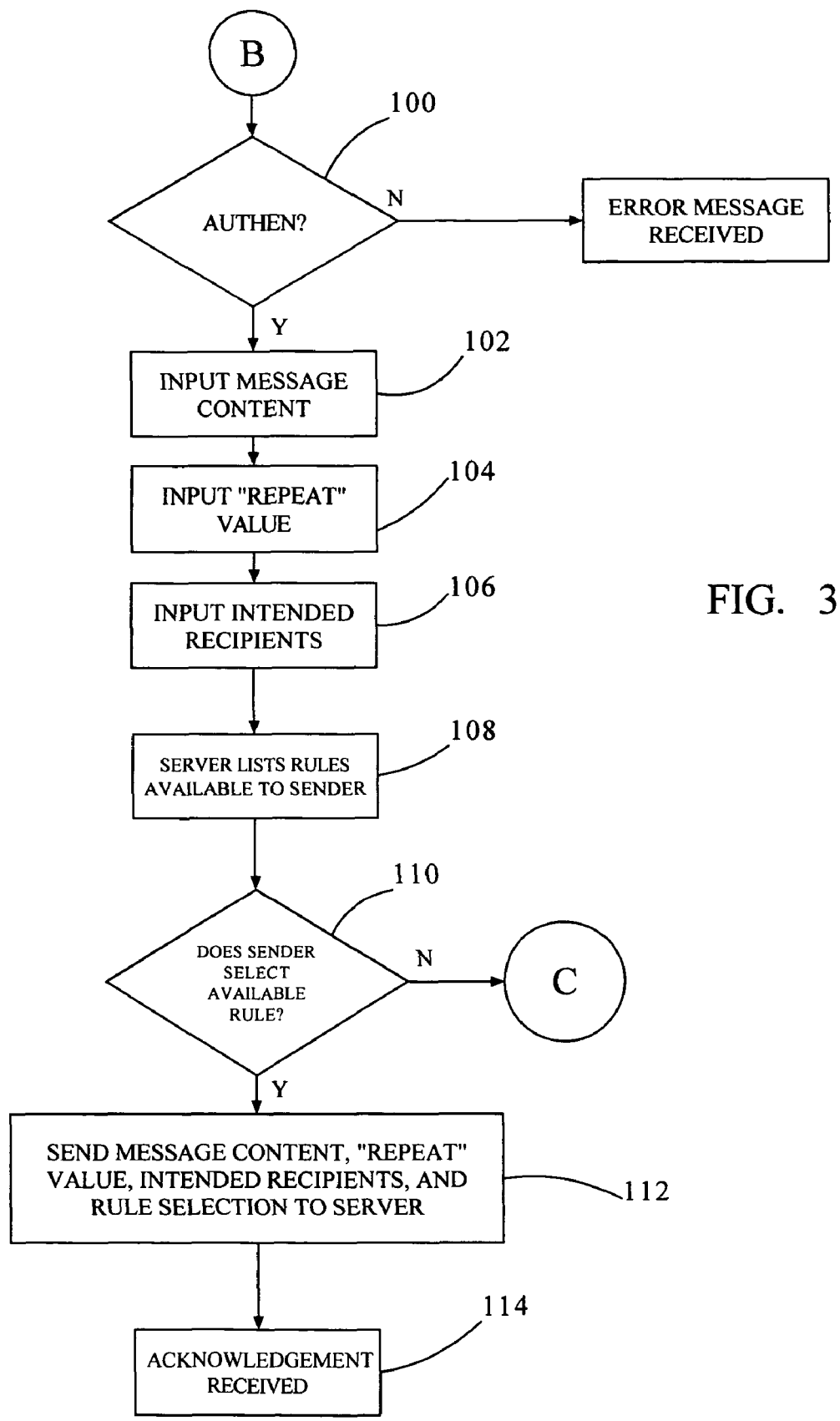
FIG. 3 is a flowchart of functions performed in accordance with the present invention by the sending device to create a message.

If it is determined, per 62, that the client is creating a message, this will initiate the steps shown in FIG. 3.

An overview will now be provided explaining how a client creates a message. As pointed out above, the message data includes the message, a list of recipients, and a delivery rule. As explained below, a "repeat" value for the message is also inputted. The sender uses menus (not shown) displayed on the sending device to create these components, in a manner which is readily apparent to anyone with ordinary skill in the art, and the server stores the message in Table No. 3.

More specifically, the sending device first authenticates itself to the server, per 100, by providing the SESSION ID obtained during LOGIN, as explained above. Authentication is successful if the SESSION ID received from the client matches the SESSION ID stored in the server. The sender then inputs the message data, per 102.

The sender next inputs the "repeat" value of the message, per 104. The REPEAT VALUE can be one of four values corresponding, respectively, to the following options:

Option 1: "only once to any recipient".

This option sends the message once to ANYONE satisfying the rule, but no more than once. For instance, the weather forecast should be sent out to anyone who wants one, but no more than once.

Option 2: "only once to all recipients".

The difference between this and the previous option is that once SOMEONE receives the message, no more messages get sent out to anyone. It is useful for groups of people in which only one needs to receive the message. For example, a group of lost hikers, each with their own mobile phone, only needs one member of their party to receive a message that help on the way. For a surprise party, with all attendees gathered in a room, only one of them needs to know that the guest of honor is approaching.

Option 3: "repeatedly to recipients for as long as the rule is satisfied".

This option sends messages to recipients over and over again. For instance, if Bill and Joe were separated hikers and Bill and wanted Joe to catch up to him, Bill's rule might send Joe a message repeatedly telling Joe the distance and direction to Bill.

Option 4: "repeatedly to recipients whenever the rule becomes satisfied".

This option sends messages to recipients whenever the rule becomes satisfied. For instance, picture a 100 m zone around the sender's office. The sender wants intra-office directions (e.g. "take the elevator to the 12th floor") sent whenever recipients cross the threshold into that 100 m zone. The rule will stay in effect. Thus, the next time a recipient visits the sender's office, the rule will trigger again—but it won't trigger until the recipient leaves thedesignated location and comes back.

Next, per 106, the sender inputs the intended recipients by their name (e.g., "John"). Of course, other contact information can also be used, such as the email address, phone no., etc. which is in the server's database. When "John" is entered, for example, the server accesses Table 2 and looks up the corresponding GUID, and it is that GUID that is entered into the Recipient GUID field in Table 3 (see the last example listed in Table 3).

Figure 4:
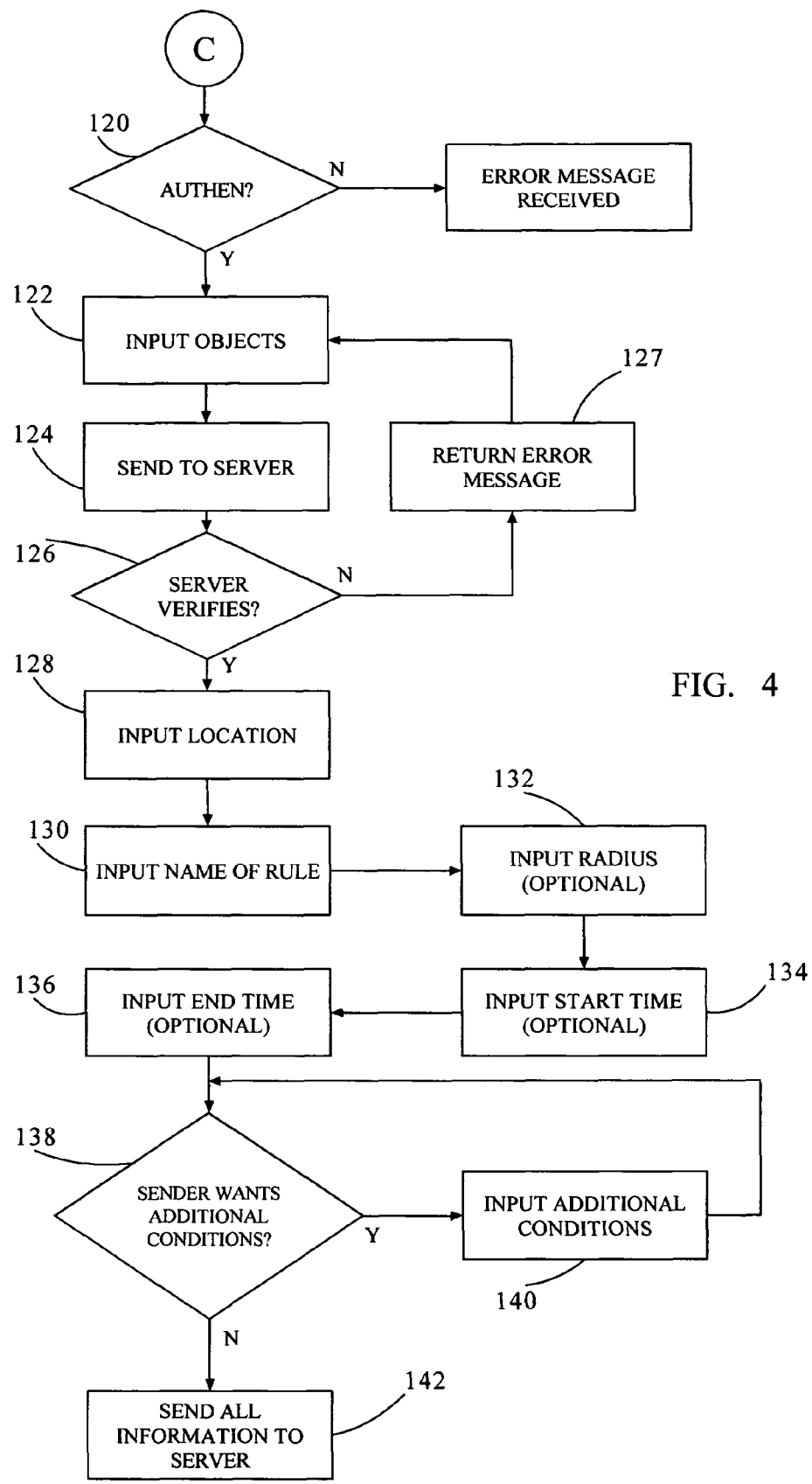
FIG. 4 is a flowchart of functions performed by the sending device to create a new rule for delivering a message.

Then, per 108, the client receives from the server a list of rules which are available to that sender, generated from Table 1. The sender can choose any of the rules, or opt to create a new rule. If the sender opts to create a new rule, as determined per 110, the process detailed in FIG. 4 is followed. If the sender picks any of the previously entered rules, it is added to the Rule Name field of Table 3.

Then, per 112, the client transmits to the server the information shown in Table 3. The server stores that information in its database and delivers the message to the recipient(s) at a later time whenever the rule's conditions are satisfied. Finally, an acknowledgement is returned, per 114.

An overview will now be provided explaining how the sender creates a rule, in accordance with FIG. 4, after step 110 (FIG. 3) has been performed. The sender uses, for example, menus (not shown) displayed on the sending device to define a rule, which has several components (e.g. rule name, delivery location, radius, start time, end time, proximity conditions of mobile objects, and other conditions). Once the sender has defined the rule, it is sent to the server and stored in accordance, for example, with the depiction in Table No. 1.

More specifically, after the client successfully authenticates itself to the server per 120, as explained above, the sender optionally inputs, per 122, the mobile object(s) that is (are) specified to trigger delivery of the message. If the sender intends motion of the recipient to trigger delivery, this step is skipped since this condition is a default condition. If, however, a mobile object (or objects) other than the intended recipient is to trigger delivery, then its identifying information (see discussion above in connection with step 106) is entered in the Other Conditions field.

The inputted object is sent to the server, per 124, and the server verifies, per 126, that the inputted object is one that it recognizes. Otherwise, an error message is returned, per 127.

In step 128, the sender designates a delivery location by specifying its location type and then the location itself.

The sender then inputs, per 130, the name by which the rule will be referred to when used to send messages.

Next, the sender optionally inputs, per 132, a radius surrounding the boundary of the location. For instance, if the sender specified the location as a particular latitude/longitude position datapoint, the radius would define a circle around that latitude and longitude constituting the active region that could trigger delivery of the message.

The sender then optionally inputs a start time, per 134. The server will not deliver any message using the rule prior to this time.

The sender then optionally inputs an end time, per 136. The server will not deliver any message using the rule after this time.

If the sender optionally wants to input one or more additional conditions shown in Table 1 as "Proximity Conditions" and "Other Conditions", this is determined per 138. The additional conditions are entered per 140, and then all the delivery conditions of the rule are sent to be stored in the server, per 142. Later, after the rule has been stored on the server, the server will, upon receipt of a mobile object location that satisfies the previous conditions of the rule, execute the additional conditions using an embedded interpreter (such as the Perl interpreter available from http://www.cpan.org), yielding a true or false value. If all the additional conditions yield a true value, and all previous conditions of the rule were also satisfied, the server delivers the message.

Returning now to FIG. 2, if it is determined, per 68, that a client is reporting its position, this triggers initiation of a message delivery procedure in that the server checks whether the existence of that object in that position causes any of the rules in Table 1 to be satisfied. More specifically, step 70 extracts the first rule stored for that position in the server. If step 72 determines that all of the rule's conditions are satisfied, then the message is delivered to its intended recipients, per 74. Otherwise, step 76 checks whether the server has any more rules associated with this position. If so, then the next rule is retrieved from the server, per 78, and checked, per 72. When there are no more rules associated with this position, the flow returns to the initial portion of FIG. 2.

If none of the decision operations 40, 50, 56, 62 and 68 yields a positive result, then step 80 returns an error message.

As is evident from the above, the sending modality (e.g., whether the message is text, audio, video, stills, or a combination of the above) and the channel (e.g. the network and protocol for transmitting the message, such as GPRS over the cell network) are chosen by the sender. The manner of notification (i.e. how the recipient is alerted to the existence of the message, such as the mobile phone chirps or vibrates) is chosen by the recipient. Thus, the recipients select whether, when the message is delivered, their mobile phone rings, vibrates, or shows a text message, depending on how they individually configure their phone. Such details are conventional and well known, and thus need not be provided herein.

In order to more fully appreciate the value of the present invention and how it can be applied and used, the following examples are presented.

Scenario 1: A person ("user") is visiting a specific city and decides to have a meal. He walks along a row of restaurants with his mobile phone and, as he does so, he views on the phone's display impromptu "floating" comments/reviews/recommendations left at each restaurant location by earlier patrons who are also users of the system incorporating the present invention.

Scenario 2: A store offers "floating" coupons visible on mobile phones—so long as those phones are within three blocks of the store. "Coats half price—just 300 feet away at ABC Clothing."

Scenario 3: A person wants to leave a voice message for a colleague, but doesn't want to bother him at home, so he creates a message that the colleague will only receive once he leaves home.

Scenario 4: Friends are planning a surprise birthday party for Mr. X. The location is changed at the last minute by Ms. Y, who sends messages to all the friends, with the condition that the message is only delivered if Mr. X is more than 30 meters away from each one so as not to "blow" the surprise.

Scenario 5: It is known to provide keyless entry to a car or house through RFID (Radio Frequency Identification) or Bluetooth, which have limited ranges. With the position-based messaging in accordance with the present invention, there is no limit to the range.

Scenario 6: A person and his luggage both carry position-sensing devices. When they are both away from frequently-visited locations (e.g., the user is traveling) and the luggage is separated from the person by more than 100 meters, the person is immediately sent a warning message.

Scenario 7: When a person awakens in the morning and leaves his bedroom, he's messaged with an up-to-the-minute weather forecast for the day.

Scenario 8: A parent with a terminal illness creates a message to be read near his grave by his child many years from now, on his 21st birthday. See the "Dying Message" rule in Table 1.

As is evident from the discussion provided above, the present invention mediates communication between a sender and multiple recipients based on the position of mobile objects carrying or containing position-sensing devices, regardless of a) how those positions are determined, b) the modality of the message, c) how the message is encoded, d) how the message is transmitted, and e) what device receives the message.

Although a preferred embodiment of the present invention has been described in detail above, various modifications thereto will be readily apparent to anyone with ordinary skill in the art. All such modifications are intended to fall within the scope of the present invention as defined by the following claims.

The invention claimed is:

1. A method to electronically deliver a message from a sender to an intended recipient based on tracking movement of a third device, the method comprising acts of:
  enabling both the sender using a first device and the intended recipient using a second device to send and receive an electronically deliverable message between the first and second devices;
  obtaining a message provided by the sender;
  obtaining a location designated by the sender for delivery of said message;
  tracking the third device having a position-determining device that determines its own current position, and which transmits its then current position at preset time intervals;
  determining from the transmitted current position whether the third device has reached said designated location; and
  initiating a procedure for automatic delivery of said message electronically to the second device of the intended recipient upon the third device being determined to have reached said designated location, with each of the first, second and third devices being different devices;
  wherein the third device is identified by the sender.

2. The method of claim 1, wherein the intended recipient is animate.

3. The method of claim 1, wherein the intended recipient is inanimate.

4. The method of claim 1, wherein said message is at least one of data, text, audio and video.

5. The method of claim 1, wherein a mode in which said message is reproduced for the intended recipient is in accordance with a setting controlled by the intended recipient.

6. The method of claim 1, wherein delivery of said message is controlled in accordance with a delivery rule provided by the sender.

7. The method of claim 6, wherein initiating said procedure for automatic delivery of said message upon detection of said third device reaching said designated location message comprises processing said delivery rule.

8. The method of claim 1, wherein said obtaining of the message comprises receiving and storing a message based on input from the sender.

9. The method of claim 1, wherein said obtaining of the message comprises retrieving a message from among a plurality of stored messages based on input from the sender.

10. The method of claim 1, wherein said obtaining of the designated location comprises obtaining a location based on input from the sender.

11. The method of claim 1, wherein said obtaining of the designated location comprises retrieving a location from among a plurality of stored locations based on input from the sender.

12. The method of claim 1, further comprising obtaining an identification of the intended recipient based on input from the sender.

13. The method of claim 6, wherein said rule includes instructions for repeating delivery of said message.

14. The method of claim 6, wherein said intended recipient includes a plurality of recipients identified by the sender.

15. The method of claim 1, comprising an act of controlling delivery of the message in accordance with a delivery rule provided by the sender, wherein said delivery rule is based on at least one of a proximity condition between the second and third devices, a weather condition, and investment information.

16. A method for delivering a message with an electronic communication system servicing a plurality of clients in a client-server relationship, wherein the system includes a server, and wherein each of the clients includes a position-determining device, the method comprising acts of:
  providing each of the clients with a position-determining device that determines its own current position;
  obtaining, at the server, a message based on input from a first client;
  obtaining, at the server, a designated location based on input from said first client;
  obtaining, at the server, an identification of a second client as the intended recipient of said message, based on input from said first client;
  obtaining, at the server, identification of a third client which is to be tracked for delivery of said message;
  determining, from the position-determining device of said third client to be tracked for delivery of said message, whether said third client being tracked has arrived at said designated location; and
  automatically triggering electronic delivery of said message to the second client upon said third client being determined to have arrived at said designated location, with each of the first, second and third clients being different clients.

17. The method of claim 16, wherein said act of obtaining identification of the third client to be tracked for delivery of said message comprises obtaining said identification based on input from the first client.

18. A method for operating an electronic communications system servicing a plurality of users for enabling any sender using a first device to automatically deliver a message electronically to an intended recipient using a second device, based on the tracked position of a third device, the method comprising acts of:
enabling each of the plurality of users to both send and receive electronic message data;
processing and storing electronic message data provided by the sender;
tracking the position of the third device;
automatically delivering the stored electronic message data to the second device of the intended recipient upon arrival of the third device at a designated location, with each of the first, second and third devices being different devices.

19. The method of claim 18, wherein said message data includes said message, said intended recipient, and a delivery rule.

20. The method of claim 18, wherein said message data includes said message.

21. The method of claim 18, wherein said message data includes said intended recipient.

22. The method of claim 18, wherein said message data includes a delivery rule.

23. The method of claim 18, wherein said message data includes identity of said specified mobile object.

24. The method of claim 18, wherein said message data includes said designated location.

25. Apparatus to electronically deliver a message from a sender using a first device to an intended recipient using a second device based on tracking movement of a third device, the apparatus comprising:
means for enabling both the sender and the intended recipient to send and receive an electronically deliverable message;
means for obtaining a message provided by the sender;
means for obtaining a location designated by the sender for delivery of said message;
means for tracking the third device having a position-determining device that determines its own current position, and which transmits its then current position at preset time intervals;
means for determining from the transmitted current position whether the third device has reached said designated location;
means for initiating a procedure for automatic delivery of said message electronically to the second device of the intended recipient upon the third device being determined to have reached said designated location, with each of the first, second and third devices being different devices.

26. Apparatus for delivering a message with an electronic communication system servicing a plurality of clients in a client-server relationship, wherein the system includes a server, and wherein each of the clients includes a position-determining device for determining its own current position, the apparatus comprising:
means for obtaining, at the server, a message based on input from a first client;
means for obtaining, at the server, a designated location based on input from said first client;
means for obtaining, at the server, an identification of a second client as the intended recipient of said message, based on input from said first client;
means for obtaining, at the server, identification of a third client to be tracked for delivery of said message;
means for determining, from the position-determining device of said client to be tracked for delivery of said message, whether the third client being tracked has arrived at said designated location;
means for automatically triggering electronic delivery of said message to the second client of the intended recipient upon the third client being determined to have arrived at said designated location, with each of the first, second and third clients being different clients.

27. Apparatus for delivering a message with an electronic communication system servicing a plurality of clients in a client-server relationship, wherein the system includes a server, and wherein each of the clients includes a position-determining device for determining its own current position, the apparatus comprising:
means for obtaining, at the server, a message based on input from a first client;
means for obtaining, at the server, a designated location based on input from said first client;
means for obtaining, at the server, a delivery rule based on input from said first client for delivering said message to a second client of an intended recipient, wherein said delivery rule includes arrival of a third client at said designated location;
means for determining, from the position-determining device of the third client, whether the third client has arrived at said designated location;
means for upon the third client being determined to have arrived at said designated location, triggering electronic delivery of said message to the second client of the intended recipient, based upon said delivery rule,
with each of the first, second and third clients being different clients.

28. Apparatus for operating an electronic communications system servicing a plurality of users for enabling any sender using a first device to automatically deliver a message electronically to an intended recipient using a second device, based on the tracked position of a third device, the apparatus comprising:
means for enabling both the sender and the intended recipient to send and receive an electronically deliverable message;
means for processing and storing message data provided by the sender;
means for tracking the position of the third device;
means for automatically delivering a message electronically to the second device of the intended recipient upon arrival of the third device at a designated location, with each of the first, second and third devices being different devices.

29. A method to electronically deliver a message from a sender using a first device to an intended recipient using a second device based on tracking movement of a third device, the method comprising acts of:
obtaining a message provided by the sender;
obtaining a location designated by the sender for delivery of said message;
tracking the third device having a position-determining device that determines its own current position, and which transmits its then current position at preset time intervals;

determining from the transmitted current position whether the third device has reached said designated location; and initiating a procedure for automatic delivery of said message electronically to the second device of the intended recipient upon the third device being determined to have reached said designated location, with each of the first, second and third devices being different devices.

30. A method to electronically deliver a message from a sender using a first device to an intended recipient using a second device based on tracking movement of a third device, the method comprising acts of:

obtaining a message provided by the sender;

obtaining a location designated by the sender for delivery of said message;

tracking the third device having a position-determining device that determines its own current position, and which transmits its then current position at preset time intervals;

determining from the transmitted current position whether the third device has reached said designated location; and initiating a procedure for automatic delivery of said message electronically to the second device of the intended recipient upon the third device being determined to have reached said designated location, wherein said message is at least one of data, text, audio and video modes, wherein a mode in which said message is reproduced by the second device for the intended recipient is in accordance with a setting controlled by the intended recipient, with each of the first, second and third devices being different devices.

31. A method to electronically deliver a message from a mobile sender using a first device to an intended recipient using a second device based on tracking movement of a third device, the method comprising:

obtaining a message provided by the mobile sender;

obtaining a location designated by the mobile sender for delivery of said message;

tracking the third device having a position-determining device that determines its own current position, and which transmits its then current position at preset time intervals;

determining from the transmitted current position whether the third device has reached said designated location;

initiating a procedure for automatic delivery of said message electronically to the second device of the intended recipient upon the third device being determined to have reached said designated location, with each of the first, second and third devices being different devices.

* * * * *